(12) United States Patent
Betso et al.

(10) Patent No.: US 6,218,470 B1
(45) Date of Patent: *Apr. 17, 2001

(54) THERMOPLASTIC ELASTOMERIC BLENDS

(75) Inventors: Stephen R. Betso, Horgen (CH); Martin J. Guest, Terneuzen; Peter F. M. van den Berghen, Graauw, both of (NL); Antonio Batistini, Zurich (CH)

(73) Assignee: The Dow Chemical Company, Midland, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/946,126

(22) Filed: Oct. 7, 1997

Related U.S. Application Data

(63) Continuation of application No. 08/601,471, filed on Feb. 14, 1996, now abandoned, which is a continuation of application No. 08/252,489, filed on Jun. 1, 1994, now abandoned.

(51) Int. Cl.$^7$ ..................................................... C08L 53/00
(52) U.S. Cl. ................................................................ 525/98
(58) Field of Search ................................................. 525/98

(56) References Cited

U.S. PATENT DOCUMENTS

| | | | |
|---|---|---|---|
| 3,595,942 | 7/1971 | Wald et al. | 260/880 |
| 3,645,992 | * 2/1972 | Elston | 526/348.6 |
| 4,479,989 | * 10/1984 | Mahal | 525/98 |
| 4,509,821 | 4/1985 | Stenger | 350/96.23 |
| 4,668,752 | * 5/1987 | Tominari et al. | 526/348.6 |
| 4,835,218 | * 5/1989 | Yoshimura et al. | 525/98 |
| 4,904,731 | * 2/1990 | Holdin et al. | 525/98 |
| 5,026,798 | 6/1991 | Canich | 526/127 |
| 5,091,471 | * 2/1992 | Graves et al. | 525/98 |
| 5,272,236 | * 12/1993 | Lai et al. | 526/348.6 |
| 5,278,272 | * 1/1994 | Lai et al. | 525/348.6 |
| 5,340,840 | 8/1994 | Park et al. | 521/60 |

FOREIGN PATENT DOCUMENTS

| | | | |
|---|---|---|---|
| 54-120658 | * 9/1979 | (JP) . | |
| 61-009448 | * 1/1986 | (JP) . | |
| 62-179543 | * 8/1987 | (JP) . | |
| 9208764 | 5/1992 | (WO) . | |
| WO 93/08221 A2 | 4/1993 | (WO) | C08F/10/00 |
| WO 94/06859 A1 | 3/1994 | (WO) | C08L/23/04 |
| 9418263 | 8/1994 | (WO) . | |
| WO 94/18263 A1 | 8/1994 | (WO) | C08J/5/18 |
| WO 94/25515 A1 | 11/1994 | (WO) | C08J/9/14 |
| WO 95/27756 | 10/1995 | (WO) | C08L/53/00 |

OTHER PUBLICATIONS

Product Brochure: Kraton G for Polymer Modification, "Description of Kraton G rubber," pp. 1–8.

Holden, G., "Applications of Thermoplastic Elastomers," Chapter 13, *Thermoplastics Elastomers*, pp. 481–497, 505–506.

* cited by examiner

*Primary Examiner*—Peter D. Mulcahy

(57) ABSTRACT

A thermoplastic elastomeric blend composition comprising: A) from 99 to 1 weight percent of an elastomer block copolymer comprising at least one segment of a styrenic polymer and at least one segment of an elastomeric saturated olefin polymer; and B) from 1 to 99 weight percent of a linear or substantially linear ethylene/α-olefin interpolymer, and fabricated articles made from such composition.

24 Claims, No Drawings

THERMOPLASTIC ELASTOMERIC BLENDS

CROSS-REFERENCE TO RELATED APPLICATION

This is a continuation of application Ser. No 08/601,471, filed Feb. 14, 1996, now abandoned, which is a continuation of application Ser. No. 08/252,489, filed Jun. 1, 1994, now abandoned.

FIELD OF THE INVENTION

This invention relates to a thermoplastic elastomeric blend composition comprising an elastomer block copolymer and an ethylene/α-olefin interpolymer, and to fabricated articles made therefrom.

BACKGROUND OF THE INVENTION

Elastomer block copolymers of polystyrene and rubber are widely used in the industry, frequently for impact modification of thermoplastic resins and engineering thermoplastics or for compatibilization of different types of resins. The class of elastomer saturated rubber block copolymers, such as exemplified by styrene-ethylene/butene-styrene block copolymers (S-EB-S), however, is expensive to produce. These materials are used when high performance and/or clarity or transparency are required. Blends of polymer components not readily miscible with these block copolymers, such as conventional polyethylenes, can exhibit inferior mechanical properties, especially failure properties and poorer ductility related properties, such as tensile elongation at rupture.

It would be desirable to provide lower cost blends of these block copolymers by adding a polymeric component that does not significantly decrease the required performance properties. It would be further desirable to provide blends of these block copolymers and a polymeric component thereby maintaining or improving the performance of these block copolymers while providing transparent blends. It would also be desirable to improve U.V. stability and abrasion resistance of these block copolymers.

SUMMARY OF THE INVENTION

According to the present invention there is provided a thermoplastic elastomeric blend composition comprising:

A) from 99 to 1 weight percent of an elastomer block copolymer comprising at least one segment of a styrenic polymer and at least one segment of an elastomeric saturated olefin polymer; and B) from 1 to 99 weight percent of a substantially linear ethylene/α-olefin interpolymer, wherein the substantially linear ethylene/α-olefin interpolymer is characterized as having:

a) a melt flow ratio, $I_{10}/I_2$, $\geq 5.63$, b) a molecular weight distribution, $M_w/M_n$, defined by the equation: $M_w/M_n \leq (I_{10}/I_2) - 4.63$, c) a density from 0.85 to 0.90 g/cm$^3$, and d) a critical shear rate at onset of surface melt fracture of at least 50 percent greater than the critical shear rate at the onset of surface melt fracture of a linear ethylene/α-olefin interpolymer having about the same $I_2$ and $M_w/M_n$.

According to another aspect, the present invention provides a thermoplastic elastomeric blend composition comprising:

A) from 99 to 1 weight percent of an elastomer block copolymer comprising at least one segment of a styrenic polymer and at least one segment of an elastomeric saturated olefin polymer; and B) from 1 to 99 weight percent of a substantially linear ethylene/α-olefin interpolymer, wherein the substantially linear ethylene/α-olefin interpolymer is characterized as having:

a) a melt flow ratio, $I_{10}/I_2$, $\geq 5.63$, b) a molecular weight distribution, $M_w/M_n$, defined by the equation: $M_w/M_n \leq (I_{10}/I_2) - 4.63$, c) a density from 0.85 to 0.90 g/cm$^3$, and d) a processing index less than or equal to about 70 percent of the PI of a linear ethylene/α-olefin interpolymer having about the same $I_2$ and $M_w/M_n$.

According to a further aspect, there is provided a thermoplastic elastomeric blend composition comprising:

A) from 99 to 1 weight percent of an elastomer block copolymer comprising at least one segment of a styrenic polymer and at least one segment of an elastomeric saturated olefin polymer; and B) from 1 to 99 weight percent of a substantially linear ethylene/α-olefin interpolymer, wherein the substantially linear ethylene/α-olefin interpolymer is characterized as having:

a) a melt flow ratio, $I_{10}/I_2$, $\geq 5.63$, b) a density from 0.85 to 0.90 g/cm$^3$, and c) a molecular weight distribution, $M_w/M_n$, from about 1.5 to about 2.5.

According to another aspect, the present invention provides a thermoplastic elastomeric blend composition comprising:

A) from 99 to 1 weight percent of an elastomer block copolymer comprising at least one segment of a styrenic polymer and at least one segment of an elastomeric saturated olefin polymer; and B) from 1 to 99 weight percent of at least one homogeneously branched linear ethylene/α-olefin interpolymer, wherein the α-olefin is a $C_3$–$C_{20}$ α-olefin and having a density of 0.85 to 0.90 g/cm$^3$.

In yet another aspect the present invention provides a fabricated article made from such a thermoplastic elastomeric blend composition.

Both the substantially linear and the homogeneously branched linear ethylene/α-olefin interpolymers are ethylene/α-olefin interpolymers having a short chain branching distribution index (SCBDI) greater than about 30 percent. Both the substantially linear and linear interpolymers have a single melting point, as opposed to traditional Ziegler polymerized polymers having two or more melting points (determined using differential scanning calorimetry (DSC)).

DETAILED DESCRIPTION OF THE INVENTION

The term "interpolymer" is used herein to indicate a polymer wherein at least two different monomers are polymerized to make the interpolymer.

The term "homogeneously branched linear ethylene/α-olefin interpolymers" means that the olefin polymer does not have long chain branching and wherein the short chain branches derived from the comonomer polymerized into the interpolymer are homogeneously distributed both within the same and between different polymer chains. That is, the linear ethylene/α-olefin interpolymer has an absence of long chain branching, as for example the linear low density polyethylene polymers or linear high density polyethylene polymers made using uniform branching (i.e., homogeneously branched) distribution polymerization processes (e.g., U.S. Pat. No. 3,645,992 (Elston), the disclosure of which is incorporated herein by reference) and wherein the comonomer is randomly distributed within a given interpolymer molecule and wherein substantially all of the interpolymer molecules have substantially the same ethylene/comonomer ratio within that interpolymer. The term "homogeneously branched linear ethylene/α-olefin interpolymers" does not refer to high pressure branched polyethylene which is known to those skilled in the art to have numerous long chain branches nor to the traditional heterogeneously branched linear low density polyethylene. Typically, the homogeneously branched linear ethylene/α-olefin interpolymer is an ethylene/α-olefin interpolymer, wherein the α-olefin is at least one $C_3$–$C_{20}$ α-olefin (e.g., propene, 1-butene, 1-pentene, 4-methyl-1-pentene, 1-hexene, 1-octene and the like), preferably wherein at least one of the α-olefins is 1-octene. Most preferably, the ethylene/α-olefin interpolymer is a copolymer of ethylene and a $C_5$–$C_{20}$ α-olefin, especially an ethylene/1-octene copolymer.

The substantially linear ethylene/α-olefin interpolymers of the present invention are not in the same class as traditional linear ethylene/α-olefin interpolymers (e.g., heterogeneously branched linear low density polyethylene, linear high density polyethylene, or homogeneously branched linear polyethylene), nor are they in the same class as traditional highly branched low density polyethylene. The substantially linear olefin interpolymers useful in this invention have excellent processability, even though they have relatively narrow molecular weight distributions. Surprisingly, the melt flow ratio ($I_{10}/I_2$) of the substantially linear olefin interpolymers can be varied essentially independently of the polydispersity index i.e., molecular weight distribution ($M_w/M_n$)). This is contrasted with conventional heterogeneously or homogeneously branched linear polyethylene resins having rheological properties such that as the polydispersity index increases, the $I_{10}/I_2$ value also increases.

The term "substantially linear" ethylene/α-olefin interpolymers means that the polymer backbone is substituted with about 0.01 long chain branches/1000 carbons to about 3 long chain branches/1000 carbons, more preferably from about 0.01 long chain branches/1000 carbons to about 1 long chain branches/1000 carbons, and especially from about 0.05 long chain branches/1000 carbons to about 1 long chain branches/1000 carbons.

The substantially linear ethylene/α-olefin interpolymers of the present invention are herein defined as in U.S. Pat. No. 5,272,236 and in U.S. Pat. No. 5,278,272, the disclosures of which are herein incorporated by reference. The substantially linear ethylene/α-olefin interpolymers useful for blending with the elastomer block copolymer are those in which the comonomer is randomly distributed within a given interpolymer molecule and wherein substantially all of the interpolymer molecules have substantially the same ethylene/comonomer ratio within that interpolymer.

Long chain branching is defined herein as a chain length of at least about 6 carbons, above which the length cannot be distinguished using $^{13}C$ nuclear magnetic resonance spectroscopy. The long chain branch can be as long as about the same length as the length of the polymer backbone.

Long chain branching is determined by using $^{13}C$ nuclear magnetic resonance ($^{13}C$ NMR) spectroscopy and is quantified using the method of Randall (Rev. Macromol. Chem. Phys., C29 (2&3), p. 285–297), the disclosure of which is incorporated herein by reference.

The substantially linear ethylene/α-olefin interpolymers for use in the present invention are interpolymers of ethylene with at least one $C_3$–$C_{20}$ α-olefin. Examplary of such comonomers are propene, isobutene, 1-butene, 1-hexene, 4-methyl-1-pentene, 1-octene, 1-decene, and 1-dodecene. Preferred are interpolymers of ethylene and at least one $C_4$–$C_{20}$ α-olefin, more preferably at least one $C_6$–$C_{20}$ α-olefin. Copolymers of ethylene and 1-octene are especially preferred.

The density of the homogeneously branched linear or substantially linear ethylene/α-olefin interpolymers (as measured in accordance with ASTM D-792) for use in the present invention is generally from about 0.85 g/cm3 to about 0.90 g/cm$^3$, preferably from about 0.86 g/cm3 to about 0.89 g/cm$^3$. The density limitation is critical for the clarity or transparency and the performance properties of the compositions. At densities substantially above 0.90 g/cm$^3$, the transparancy of the composition diminishes significantly. At densities substantially below 0.85 g/cm$^3$ the blend becomes somewhat tacky in nature.

The molecular weight of the homogeneously branched linear or substantially linear ethylene/α-olefin interpolymers for use in the present invention is conveniently indicated using a melt index measurement according to ASTM D-1238, Condition 190° C./2.16 kg (formerly known as "Condition (E)" and also known as $I_2$). Melt index is inversely proportional to the molecular weight of the polymer. Thus, the higher the molecular weight, the lower the melt index, although the relationship is not linear. The melt index for the homogeneously branched linear or substantially linear ethylene/α-olefin interpolymers useful herein is generally from about 0.01 grams/10 minutes (g/10 min) to about 100 g/10 min. Preferably, the melt index is from about 0.5 g/10 min to about 20 g/ 10 min, most preferably from about 1 g/10 min to about 5 g/10 min.

Another measurement useful in characterizing the molecular weight of the homogeneously branched linear or the substantially linear ethylene/α-olefin interpolymers is conveniently indicated using a melt index measurement according to ASTM D-1238, Condition 190° C./10 kg (formerly known as "Condition (N)" and also known as $I_{10}$). The ratio of the $I_{10}$ and the $I_2$ melt index terms is the melt flow ratio and is designated as $I_{10}/I_2$. For the substantially linear ethylene/α-olefin interpolymers used in the compositions of the invention, the $I_{10}/I_2$ ratio indicates, for a given molecular weight distribution and molecular weight distribution, the degree of long chain branching, i.e., the higher the $I_{10}/I_2$ ratio, the more long chain branching in the polymer. The $I_{10}/I_2$ ratio of the substantially linear ethylene/α-olefin interpolymers is preferably at least about 7, especially at least about 8. The $I_{10}/I_2$ ratio of the linear ethylene/α-olefin interpolymers is generally about 6.

The "rheological processing index" (PI) is the apparent viscosity (in kpoise) of a polymer measured by a gas extrusion rheometer (GER). The gas extrusion rheometer is described by M. Shida, R. N. Shroff and L. V. Cancio in Polymer Engineering Science, Vol. 17, no. 11, p. 770 (1977), and in "Rheometers for Molten Plastics" by John Dealy, published by Van Nostrand Reinhold Co. (1982) on page 97–99, both publications of which are incorporated by reference herein in their entirety. All GER experiments are performed at a temperature of 190° C., at nitrogen pressures between 5250 to 500 psig (36–3 MPa) using a 0.0296 inch (0.0117 cm) diameter, 20:1 L/D die with an entrance angle of 180°. For the substantially linear ethylene/α-olefin interpolymers described herein, the PI is the apparent viscosity (in kpoise) of a material measured by GER at an apparent shear stress of $2.15 \times 10^6$ dyne/cm$^2$. The substantially linear ethylene/α-olefin interpolymers described herein preferably have a PI in the range of about 0.01 kpoise to about 50 kpoise, preferably about 15 kpoise or less. The substantially linear ethylene/α-olefin interpolymers described herein have a PI less than or equal to about 70 percent of the PI of a comparative linear ethylene/α-olefin interpolymer at about the same $I_2$ and $M_w/M_n$.

An apparent shear stress vs. apparent shear rate plot is used to identify the melt fracture phenomena. According to Ramamurthy in Journal of Rheology, 30(2), 337–357, 1986, above a certain critical flow rate, the observed extrudate irregularities may be broadly classified into two main types: surface melt fracture and gross melt fracture.

Surface melt fracture occurs under apparently steady flow conditions and ranges in detail from loss of specular gloss to the more severe form of "sharkskin". For the present invention, the onset of surface melt fracture (OSMF) is characterized as the beginning of losing extrudate gloss at which the surface roughness of extrudate can only be detected by 40× magnification. The critical shear rate at onset of surface melt fracture for the substantially linear ethylene/α-olefin interpolymers is at least 50 percent greater than the critical shear rate at the onset of surface melt fracture of a linear ethylene/α-olefin interpolymer having about the same I2 and $M_w/M_n$.

Gross melt fracture occurs at unsteady flow conditions and ranges in detail from regular (alternating rough and smooth, helical, etc.) to random distortions. For commercial acceptability, (e.g., in blown film products), surface defects should be minimal, if not absent. The critical shear rate at onset of surface melt fracture (OSMF) and onset of gross melt fracture (OGMF) will be used herein based on the changes of surface roughness and configurations of the extrudates extruded by a GER.

Both the homogeneously branched linear and substantially linear ethylene/α-olefin interpolymers useful for forming the compositions described herein have homogeneous branching distributions. That is, the interpolymers are those in which the comonomer is randomly distributed within a given interpolymer molecule and wherein substantially all of the interpolymer molecules have substantially the same ethylene/comonomer ratio within that interpolymer. The homogeniety of the interpolymers is typically described by the SCBDI (Short Chain Branch Distribution Index) or CDBI (Composition Distribution Branch Index) and is defined as the weight percent of the interpolymer molecules having a comonomer content within 50 percent of the median total molar comonomer content. The CDBI of an interpolymer is readily calculated from data obtained from techniques known in the art, such as, for example, temperature rising elution fractionation (abbreviated herein as "TREF") as described, for example, in Wild et al, Journal of Polymer Science, Poly. Phys. Ed., Vol. 20, p. 441 (1982), in U.S. Pat. No. 4,798,081 (Hazlitt et al.), or in U.S. Pat. No. 5,089,321 (Chum et al.) the disclosures of all of which are incorporated herein by reference. The SCBDI or CDBI for the linear and for the substantially linear olefin interpolymers used in the present invention is preferably greater than about 30 percent, especially greater than about 50 percent. The homogeneous ethylene/α-olefin interpolymers used in this invention essentially lack a measurable "high density" fraction as measured by the TREF technique (i.e., the homogeneous ethylene/α-olefin interpolymers do not contain a polymer fraction with a degree of branching less than or equal to 2 methyls/1000 carbons). The homogeneous ethylene/α-olefin interpolymers also do not contain any highly short chain branched fraction (i.e., the homogeneous ethylene/α-olefin interpolymers do not contain a polymer fraction with a degree of branching equal to or more than 30 methyls/1000 carbons).

The homogeneously branched linear and substantially linear ethylene/α-olefin interpolymer product samples are analyzed by gel permeation chromatography (GPC) on a Waters 150° C. high temperature chromatographic unit equipped with three mixed porosity columns (Polymer Laboratories $10^3$, $10^4$, $10^5$, and $10^6$), operating at a system temperature of 140° C. The solvent is 1,2,4-trichlorobenzene, from which 0.3 percent by weight solutions of the samples are prepared for injection. The flow rate is 1.0 milliliters/minute and the injection size is 200 microliters.

The molecular weight determination is deduced by using narrow molecular weight distribution polystyrene standards (from Polymer Laboratories) in conjunction with their elution volumes. The equivalent interpolymer molecular weights are determined by using appropriate Mark-Houwink coefficients for polyethylene and polystyrene (as described by Williams and Word in Journal of Polymer Science, Polymer Letters, Vol. 6, (621) 1968, incorporated herein by reference) to derive the following equation:

$$M_{polyethylene} = a * (M_{polystyrene})^b.$$

In this equation, a=0.4316 and b=1.0. Weight average molecular weight, $M_w$, is calculated in the usual manner according to the following formula:

$$M_w = \Sigma_i w_i * M_i,$$

where $w_i$ and $M_i$ are the weight fraction and molecular weight, respectively, of the ith fraction eluting from the GPC column.

For the homogeneously branched linear and substantially linear ethylene/α-olefin interpolymers, the $M_w/M_n$ is preferably from about 1.5 to about 2.5.

The substantially linear ethylene/α-olefin interpolymers can be made using the catalysts, cocatalysts, and procedures described in U.S. Pat. Nos. 5,272,236 and 5,278,272, the teachings of which are incorporated herein by reference. The monocyclopentadienyl transition metal olefin polymerization catalysts taught in U.S. Pat. No. 5,026,798, the teachings of which are incorporated herein by reference, are also suitable for use in preparing the interpolymers of the present invention, so long as the reaction conditions are as specified in U.S. Pat. Nos. 5,272,236 or 5,278,272.

Suitable cocatalysts for use herein include but are not limited to, for example, polymeric or oligomeric aluminoxanes, especially methyl aluminoxane or modified methyl aluminoxane (made, e.g., as described in U.S. Pat. Nos. 5,041,584, 4,544,762, 5,015,749, and/or 5,041,585, the disclosures of each of which are incorporated herein by reference) as well as inert, compatible, noncoordinating, ion forming compounds. Preferred cocatalysts are inert, noncoordinating, boron compounds.

The elastomer block copolymer useful in the present invention comprises at least one segment of a styrenic polymer and at least one segment of an elastomeric saturated olefin polymer. Typically these block copolymers contain hard segments of styrenic type polymers in combination with soft elastomeric segments of a saturated olefin polymer. The structure of the block copolymers useful in the present invention is not critical and can be of the diblock, triblock, radial type, or of a combination of these. Preferably, the predominant structure is that of the triblocks.

Methods for the preparation of such block copolymers are known in the art. Suitable catalysts for the preparation of precursor of the present block copolymers (block polymers before hydrogenation) include lithium based catalysts and especially lithium-alkyls. U.S. Pat. No. 3,595,942 describes suitable hydrogenation methods. The structure of the polymers is determined by their methods of polymerization. For example, linear polymers result by sequential introduction of the desired monomers into the reaction vessel when using such initiators as lithium-alkyls or dilithiostilbene and the like, or by coupling a two segment block copolymer with a difunctional coupling agent. Branched structures, on the other hand, may be obtained by the use of suitable coupling agents having a functionality with respect to the precursor polymers of three or more. Coupling may be effected with multifunctional coupling agents such as dihaloalkanes or alkenes and divinyl benzene as well as certain polar compounds such as silicon halides, siloxanes or esters of monohydric alcohols with carboxylic acids. The presence of any coupling residues in the polymer may be ignored for an adequate description of the block copolymers forming a part of the composition of this invention. The invention preferably employs selectively hydrogenated block copolymers having the configuration before hydrogenation of the following typical species: polystyrene-polybutadiene-polystyrene (SBS), polystyrene-polyisoprene-polystyrene (SIS), poly(alpha-methylstyrene)-polybutadiene-poly(alpha-methylstyrene) and poly(alpha-methylstyrene)-polyisoprene-poly(alpha-methylstyrene).

The styrenic polymer portion of the block copolymer is preferably a polymer or interpolymer of styrene and its analogs and homologs including alpha-methylstyrene and ring-substituted styrenes, particularly ring-methylated styrenes. The preferred styrenics are styrene and alpha-methylstyrene, and styrene is particularly preferred.

Precursor of elastomeric saturated olefin polymer blocks may comprise homopolymers of butadiene or isoprene and copolymers of one or both of these two dienes with a minor amount of styrene monomer. When the monomer employed is butadiene, it is preferred that between about 35 and about 55 mol percent of the condensed butadiene units in the butadiene polymer block have 1,2 configuration. Thus, when such a block in hydrogenated, the resulting product is, or resembles, a regular copolymer block of ethylene and 1-butene (EB). If the conjugated diene employed is isoprene, the resulting hydrogenated product is or resembles a regular copolymer block of ethylene and propylene (EP). Preferred examples of such elastomeric saturated olefin polymer blocks include ethylene/butylene or ethylene/propylene copolymers. Preferred elastomer block copolymers comprise at least one segment of a styrene polymer and at least one segment of an ethylene/butylene or ethylene/propylene copolymer. The most preferred elastomer block copolymer comprises a S-EB-S triblock copolymer, wherein S is a styrene polymer. These block copolymers may be modified by grafting minor amounts of functional groups to them, such as for example maleic anhydride.

Hydrogenation of the precursor block copolymers is preferably effected by use of a catalyst comprising the reaction products of an aluminum alkyl compound with nickel or cobalt carboxylates or alkoxides under such conditions as to substantially completely hydrogenate at least 80% of the aliphatic double bonds while hydrogenating no more than about 25% of the styrenic aromatic double bonds. Preferred block copolymers are those where at least 99% of the aliphatic double bonds are hydrogenated while less than 5% of the aromatic double bonds are hydrogenated.

The proportion of the styrenic blocks is generally between about 8 and 65% by weight of the block copolymer. Preferably, the block coplymers contain from 10 to 35 weight percent of styrenic polymer segments and from 90 to 65 weight percent of elastomeric saturated olefin polymer segments, based on the total weight of the block copolymer.

The average molecular weights of the individual blocks may vary within certain limits. In most instances, the styrenic blocks will have number average molecular weights in the order of 5,000–125,000, preferably 7,000–60,000 while the conjugated diene blocks either before or after hydrogenation will have average molecular weights in the order of 10,000–300,000, preferably 30,000–150,000. The total average molecular weight of the block copolymer is typically in the order of 25,000 to about 250,000, preferably from 35,000 to about 200,000. These molecular weights are most accurately determined by tritium counting methods or osmotic pressure measurements.

Block copolymers useful in the present invention are commercially available, such as the Kraton G1600 and G1700 rubber series available from Shell Chemical Company (Kraton is a trademark of Shell). Specific suitable block copolymers are Kraton G1650, G1651, G1652, G1657X, C1701, G1702, G1726X and FG1901X.

Generally, the composition comprises from about 1 percent to about 99 percent, by weight of the composition, of the linear or substantially linear ethylene/$\alpha$-olefin interpolymer and from about 99 to about 1 percent, by weight of the composition, of the elastomer block copolymer. Preferably, the composition comprises from about 1 percent to about 50 percent, more preferably from 10 to 45 percent, by weight of the composition, of the linear or substantially linear ethylene/$\alpha$-olefin interpolymer and from about 99 to about 50 percent, more preferably from 90 to 55 percent, by weight of the composition, of the elastomer block copolymer. For the compositions containing at the most 50 weight percent of substantially linear ethylene/$\alpha$-olefin interpolymer, the compositions maintain a reasonably low Shore hardness (about 10 or lower) as well as a fairly constant peak tensile stress, which are desirable properties for elastomeric materials.

Additives such as antioxidants (e.g., hindered phenolics (e.g., Irganox® 1010), phosphites (e.g., Irgafos® 168)), cling additives (e.g., PIB), antiblock additives, colourants, pigments, fillers, and the like can also be included in the present compositions, to the extent that they do not interfere with the enhanced properties discovered by Applicants.

The compositions of the present invention are compounded by any convenient method, including dry blending the individual components and subsequently melt mixing, either directly in the extruder used to make the finished article (e.g., the automotive part), or by pre-melt mixing in a separate extruder (e.g., a Banbury mixer).

There are many types of molding operations which can be used to form useful fabricated articles or parts from the present compositions, including various injection molding processes (e.g., that described in Modern Plastics Encyclopedia/89, Mid October 1988 Issue, Volume 65, Number 11, pp. 264–268, "Introduction to Injection Molding" and on pp. 270–271, "Injection Molding Thermoplastics", the disclosures of which are incorporated herein by reference) and blow molding processes (e.g., that described in Modern Plastics Encyclopedia/89, Mid October 1988 Issue, Volume 65, Number 11, pp. 217–218, "Extrusion-Blow Molding", the disclosure of which is incorporated herein by reference) and profile extrusion. Some of the fabricated articles include sports articles, containers such as for food or other household articles, footware, automotive articles, such as soft facia, sealants and assembly adhesives.

The compositions of the present invention can be further combined with many thermoplastic polymers to improve their properties, such as impact properties.

The invention will be further illustrated by means of the following examples without limiting the invention thereto.

EXAMPLE 1

In a Buss ko-kneader MDK 46 (15 kg/hour throughput, barrel temperature 220° C., screw temperature 150° C., die temperature 210° C.) several thermoplastic elastomeric blend compositions were prepared using an ethylene/1-octene copolymer prepared according to the procedures given in U.S. Pat. No. 5,278,272 and having a density of 0.87 g/cm$^3$ and a melt index ($I_2$) of 1 g/10 min. (E-1-0) and a Kraton G1650 (S-EB-S triblock) copolymer in the weight ratios 25/75, 50/50, 75/25. The strands of blended extrudate were collected, cut, and dried at 65° C. for 6 hours and then compression molded into Izod specimen bars (60×12.5×3.2 mm). The storage modulus was determined at −30° C. and 30° C. for each one of the blends as well as for the neat components using dynamic mechanical spectroscopy techniques as outlined in ASTM D-4065. Measurements were made using a Rheometrics model 800 apparatus in solid state torsion rectangular test geometry, for a heating ramp of 2° C./min from −130° C. to +50° C., with 0.1 percent torsional strain and 10 rads/sec fixed forced frequency. The samples used were rectangular compression moulded test bars of 2.8 mm×12.7 mm×60 mm. The gauge length, that is the distance between the clamps holding the sample during testing, was 46 mm. The results are shown in Table 1:

TABLE 1

| | Modulus | | ratio |
|---|---|---|---|
| | −30° C. MPa × 10$^7$ | 30° C. MPa × 10$^7$ | modulus at −30° C.: modulus at 30° C. |
| 100% E-1-0 | 25.6 | 3.06 | 8.36 |
| 75% E-1-0 | 17.2 | 2.87 | 5.99 |
| 50% E-1-0 | 10.5 | 2.35 | 4.46 |
| 25% E-1-0 | 6.14 | 1.86 | 3.30 |
| 100% Kraton G | 3.15 | 1.26 | 2.50 |

These data show that the −30° C. storage modulus and the ratio of the storage moduli at the two temperatures of the compositions do not increase as rapidly as would be predicted based on the weighted contributions of the two components. The compositions are more elastomeric than predicted. A low modulus ratio indicates that a polymeric composition possesses a more constant rigidity over the selected temperature range, which is important for products that should maintain shape and performance over a wide temperature range.

EXAMPLE 2

According to the same procedure as in Example 1 several compositions were made to determine the transparency and certain physical properties thereof.

The transparency was determined by visual inspection designating on a qualitative scale the number 0 to opaque blends and the number 5 to the S-EB-S copolymer. Shore D Hardness was determined according to DIN 53505 (ISO 868). The Tensile properties were determined according to ASTM 683-84 on type 4 dogbone specimens, size 12.7× 3.2×170 mm. The test specimens were compression molded at 190° C. The test speed was 50 mm/mm. The Secant Modulus is defined as the tangent of the stress strain curve at 2% strain. The Yield Stress is defined as the stress at the point where the tangent α of the stress/strain curve is 0.301. The peak stress is defined as the maximum stress in a tensile stress-strain curve before or at rupture. The percentage elongation is the maximum elongation obtained at rupture. The results are shown in Table 2:

TABLE 2

| Kraton G | E-1-0 | Transparency | Shore D | Yield Stress (MPa) | Peak Stress (MPa) | Secant Modulus (MPa) | % Elongation |
|---|---|---|---|---|---|---|---|
| 100 | 0 | 5 | 8 | 0.3 | 2.9 | 3.6 | >600 |
| 75 | 25 | 4 | 10 | 0.6 | 3.3 | 4.3 | >600 |
| 50 | 50 | 4 | 10 | 0.7 | 2.8 | 5.8 | >600 |
| 25 | 75 | 4 | 11 | 1.0 | 4.6 | 7.9 | >600 |
| 0 | 100 | 3 | 12 | 1.2 | 5.8 | 9.7 | >600 |

These data show that at 50 percent or less of the substantially linear interpolymer a reasonably low Shore hardness is maintained, whereas the peak stress is fairly constant. All the compositions are more transparent than the substantially linear interpolymer itself. Especially the compositions containing no more than 50 weight percent of substantially liner interpolymer show the low peak and yield stress values that are desired for elastomeric materials.

What is claimed is:

1. An extrudable and moldable elastomeric blend composition comprising:
   A) from 90 to 55 weight percent of a triblock copolymer having two segments of a styrenic polymer and one midblock segment of a saturated olefin polymer; and
   B) from 10 to 45 weight percent of a substantially linear ethylene/α-olefin interpolymer, wherein the substantially linear ethylene/α-olefin interpolymer is characterized as comprising 1-octene and having:
      a) a melt flow ratio, $I_{10}/I_2$, $\geq 5.63$,
      b) a molecular weight distribution, $M_w/M_n$, $\leq (I_{10}/I_2) - 4.63$,
      c) a density from 0.85 to 0.90 g/cm$^3$, and
      d) a critical shear rate at onset of surface melt fracture of at least 50 percent greater than the critical shear rate at the onset of surface melt fracture of a linear ethylene/α-olefin interpolymer having about the same $I_2$ and $M_w/M_n$.

2. An extrudable and moldable elastomeric blend composition comprising:
   A) from 90 to 55 weight percent of a triblock copolymer having two segments of a styrenic polymer and one midblock segment of a saturated olefin polymer; and
   B) from 10 to 45 weight percent of a substantially linear ethylene/α-olefin interpolymer, wherein the substantially linear ethylene/α-olefin interpolymer is characterized as comprising 1-octene and having:
      a) a melt flow ratio, $I_{10}/I_2$, $\geq 5.63$,
      b) a molecular weight distribution, $M_w/M_n$, $\leq (I_{10}/I_2) - 4.63$,
      c) a density from 0.85 to 0.90 g/cm$^3$, and
      d) a processing index (PI) less than or equal to about 70 percent of the PI of a linear ethylene/α-olefin interpolymer having about the same $I_2$ and $M_w/M_n$.

3. An extrudable and moldable elastomeric blend composition comprising:

A) from 90 to 55 weight percent of a triblock copolymer having two segments of a styrenic polymer and one midblock segment of a saturated olefin polymer; and B) from 10 to 45 weight percent of a substantially linear ethylene/α-olefin interpolymer, wherein the substantially linear ethylene/α-olefin interpolymer is characterized as comprising 1-octene and having:
  a) a melt flow ratio, $I_{10}/I_2, \geq 5.63$,
  b) a density from 0.85 to 0.90 g/cm$^3$,
  c) a molecular weight distribution, $M_w/M_n$ from about 1.5 to about 2.5, and
  d) a critical shear rate at onset of surface melt fracture of at least 50 percent greater than the critical shear rate at the onset of surface melt fracture of a linear ethylene/α-olefin interpolymer having about the same $I_2$ and $M_w/M_n$.

4. The composition of claim 1 wherein the substantially linear ethylene/α-olefin interpolymer has from about 0.01 to about 3 long chain branches/1000 carbons along the polymer backbone.

5. The composition of claim 2 wherein the substantially linear ethylene/α-olefin interpolymer has from about 0.01 to about 3 long chain branches/1000 carbons along the polymer backbone.

6. The composition of claim 3 wherein the substantially linear ethylene/α-olefin interpolymer has from about 0.01 to about 3 long chain branches/1000 carbons along the polymer backbone.

7. The composition of claim 1 wherein the substantially linear ethylene/α-olefin interpolymer is a copolymer of ethylene and 1-octene.

8. The composition of claim 2 wherein the substantially linear ethylene/α-olefin interpolymer is a copolymer of ethylene and 1-octene.

9. The composition of claim 3 wherein the substantially linear ethylene/α-olefin interpolymer is a copolymer of ethylene and 1-octene.

10. The composition of claim 1 wherein the density of the substantially linear ethylene/α-olefin interpolymer is from 0.86 to 0.89 g/cm$^3$.

11. The composition of claim 2 wherein the density of the substantially linear ethylene/α-olefin interpolymer is from 0.86 to 0.89 g/cm$^3$.

12. The composition of claim 3 wherein the density of the substantially linear ethylene/α-olefin interpolymer is from 0.86 to 0.89 g/cm$^3$.

13. The composition of claim 1 wherein the $I_{10}/I_2$ of the substantially linear ethylene/α-olefin interpolymer is at least about 7.

14. The composition of claim 2 wherein the $I_{10}/I_2$ of the substantially linear ethylene/α-olefin interpolymer is at least about 7.

15. The composition of claim 3 wherein the $I_{10}/I_2$ of the substantially linear ethylene/α-olefin interpolymer is at least about 7.

16. The composition of claim 1 wherein the midblock segment is an ethylene/butylene or ethylene/propylene copolymer.

17. The composition of claim 2 wherein the midblock segment is an ethylene/butylene or ethylene/propylene copolymer.

18. The composition of claim 3 wherein the midblock segment is an ethylene/butylene or ethylene/propylene copolymer.

19. The composition of claim 16 wherein the elastomer block copolymer comprises a S-EB-S triblock copolymer.

20. The composition of claim 17 wherein the elastomer block copolymer comprises a S-EB-S triblock copolymer.

21. The composition of claim 18 wherein the elastomer block copolymer comprises a S-EB-S triblock copolymer.

22. A fabricated article made from the composition of claim 1.

23. A fabricated article made from the composition of claim 2.

24. A fabricated article made from the composition of claim 3.

* * * * *